United States Patent [19]
Klieber

[11] Patent Number: 5,692,413
[45] Date of Patent: Dec. 2, 1997

[54] DEVICE FOR JOINING A BAR END TO A BASIC BAR

[76] Inventor: Jochen Klieber, Dammweg 1, D-83342 Tacherting, Germany

[21] Appl. No.: 569,093

[22] PCT Filed: Apr. 25, 1995

[86] PCT No.: PCT/EP95/01559

§ 371 Date: Mar. 1, 1996

§ 102(e) Date: Mar. 1, 1996

[87] PCT Pub. No.: WO95/29090

PCT Pub. Date: Nov. 2, 1995

[30] Foreign Application Priority Data

Apr. 27, 1994 [DE] Germany ............ 44 14 741.4

[51] Int. Cl.[6] ............................................. B62K 21/12
[52] U.S. Cl. ............... 74/551.8; 74/551.1; 403/90; 403/344; 280/279
[58] Field of Search .................... 74/551.1–551.8; 403/90, 344; 280/281, 279

[56] References Cited

U.S. PATENT DOCUMENTS

| | | | |
|---|---|---|---|
| 511,479 | 12/1893 | Westbrook | 74/551.1 |
| 3,863,521 | 2/1975 | Gastos et al. | 74/551.1 |
| 4,023,436 | 5/1977 | Dodge | 74/551.3 |
| 4,260,171 | 4/1981 | Foster | 280/279 |
| 5,000,469 | 3/1991 | Smith | 74/551.1 |
| 5,224,396 | 7/1993 | Lobbezzo et al. | 74/551.3 |
| 5,501,477 | 3/1996 | Moreau | 280/281.1 |

*Primary Examiner*—Vinh T. Luong
*Attorney, Agent, or Firm*—George W. Rauchfuss, Jr.

[57] ABSTRACT

A device for joining a steering bar end piece to a basic steering bar comprises a basic steering bar clamp and a steering bar end piece clamp, the latter being arranged relative to the basic steering bar clamp in such a way that the longitudinal axis of the steering bar end piece clamp does not intersect the outline of the basic steering bar clamp, the two clamps being connected by a transition piece.

In order to provide steering bar end pieces which are ergonomically shaped to put enough pressure on the front wheel of a bicycle on hard climbs, and yet obtain an unrestricted gripping space and a bar width which is not unduly increased, the transition piece is contiguous to the side of the basic steering bar clamp facing away from the basic steering bar, and extends essentially perpendicular to the longitudinal axis of the basis steering bar clamp, and has the steering bar end piece clamp located on the side facing away from the basic steering bar.

14 Claims, 7 Drawing Sheets

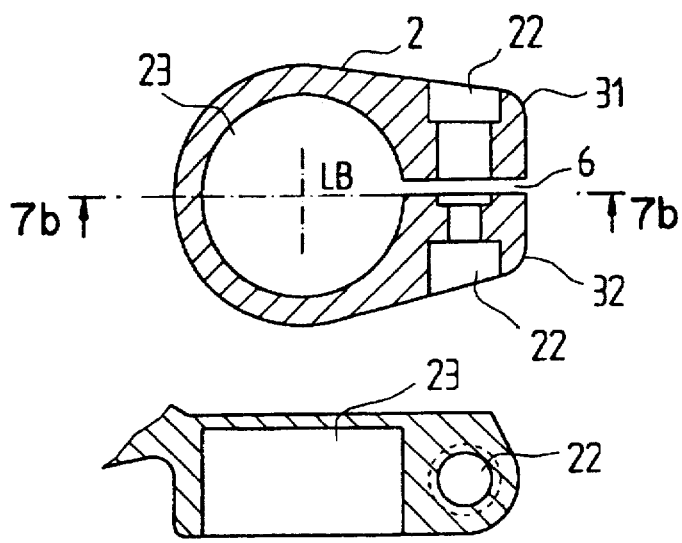
Fig. 7a
Fig. 7b
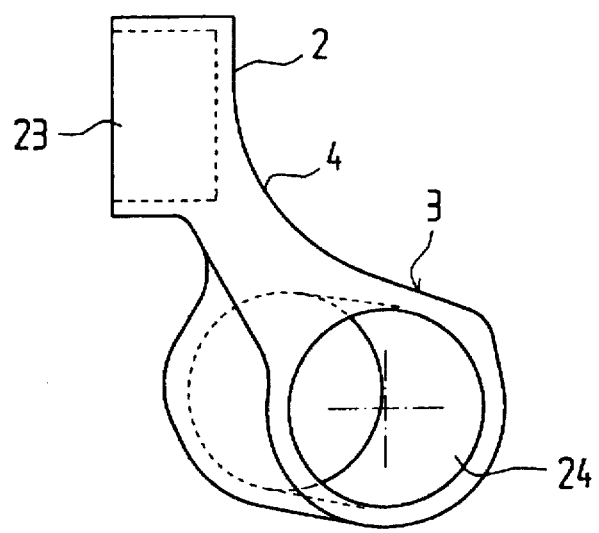
Fig. 8a
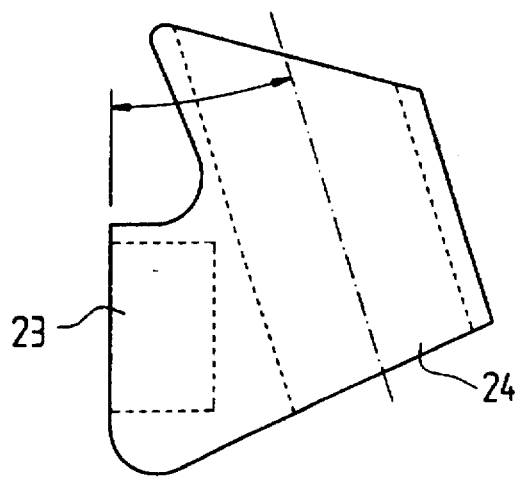
Fig. 8b

DEVICE FOR JOINING A BAR END TO A BASIC BAR

FIELD OF THE INVENTION

The present invention relates to a device for joining a bar end to a basic bar which is comprised of a basic bar clamp and a bar end clamp, the latter being offset from the basic bar clamp in such a way that the longitudinal axis of the bar end clamp does not intersect the outline of the basic bar clamp, the two clamps being connected by means of a transition piece.

BACKGROUND OF THE INVENTION

Bar ends mounted to a basic bar provide the rider with a variety of hand positions permitting aggressive yet relaxed riding. Conventional bar ends are clamped to the ends of a basic bar by securing them either to the inside or the outside of the basic bar. The internal clamping method may use an expanding collet inside the bar tube to fix the bar end in position. Overtightening the expanding collet may cause the bar tube to burst. In addition, the internal clamp has the drawback of increasing the width of the handlebar by a couple of centimeters. Shortening the bar tube does not help, because grip width is lost resulting in unsteady steering. With the external clamp method, the basic bar width is not altered. However, the hand space available on the bar is reduced by the width of the clamp securing the bar ends to the handlebar's ends. The reduction can be 4 to 5 cm. With conventional bar ends, the basic bar clamp and the bar end tube are generally a one-piece component, the longitudinal axis of the clamp intersecting the; axis of the bar end within the contour of the bar clamp. On very steep hill climbs, where the center of gravity is moved to the rear of the bicycle, the front wheel is likely to lift off. Under extreme conditions and during long climbs, conventional bar ends, although being able to push the rider's weight forward with the help of a forward hand position, partly fail to put enough pressure onto the front wheel to avoid a wheelie and fail to allow riding in a relaxed position, as the rider's arms are considerably angled.

For this reason, it has already been suggested to position the bar ends downward of the basic bar in order to increase the pressure on the frout in an effort to avoid a wheelie. According to the suggestion, an external clamp is fitted on its circumference with a connecting piece facing downward to which a bar end clamp is attached radially. The suggested configuration has the same drawback as the external clamp described previously. It does not allow to grip the handlebar at its extreme ends. Furthermore, the lack of ergonomic design makes the hands sore and numb, especially on long rides.

Therefore, it is the intent of the present invention to provide a device for joining a bar end to a basic bar which enables to put enough pressure onto the front wheel during hard climbing and which, in addition, is ergonomically designed and offers multiple grip positions. Furthermore, it is the intent of the present invention not to restrict the hand space on the handlebar and not to increase the handlebar's width needlessly.

BRIEF SUMMARY OF THE INVENTION

In accordance with the present invention, this task is solved by arranging the transition piece in such a way that

- it is contiguous to the side of the basic bar clamp which faces away from the basic bar (called "outward face" in the following),
- it extends essentially perpendicular to the longitudinal axis of the basic bar clamp, and
- it has the bar end clamp located on the side which faces away from the basic bar.

The lowered grip position on the bar ends helps to push the center of gravity to the front and to straighten the arms on hard climbs, thereby increasing riding comfort. Even on flat stretches, the rider is able to maintain an aero position due to the lowered hand position on the bar ends. The joining device in accordance with the present invention provides hand positions which overlap at the extreme end of the basic bar and at the rear section of the bar end. As a result, the grip space is not restricted and the basic bar is not lengthened. By arranging the bar end clap on the side of the transition piece, neither the transition piece nor the bar end clamp interfere with the hand positions at the basic bar's extreme ends. The arrangement of the bar end in accordance with the present invention also permits to grip the handlebar from the side. By positioning the bar end clamp in an outward direction of and away from the basic bar clamp, a hand position at the rear of the bar end is provided which permits stronger pulling on climbs. Due to the fact that both a basic bar clamp and a bar end clamp is provided, a three-dimensional alignment is possible by simply turning the joining device. In addition, the bar ends can be replaced in order to meet the rider's individual requirements.

Another favorable embodiment of the present invention is comprised of a sealing cap which adjoins the outward face of the basic bar clamp, the outward side of the transition piece as well as the portion of the bar end clamp that faces the basic bar axis. By using the sealing cap, hand comfort is increased. Protrusions or irregularities are covered up to prevent bruising the hands. In addition, by using a sealing cap of this kind, there is no need for a solid configuration of the area covered by the cap. As a result, a lightweight component can be obtained.

Preferably, the upper edge of the outward face of the basic bar clamp which is essentially perpendicular to the bar clamp's axis lies in a plane tangent to the side of the bar end clamp that faces the basic bar clamp and is also essentially perpendicular to the basic bar clamp axis. Due to the special geometry, the bar end clamp is inclined relative to the basic bar clamp, ensuring unrestricted gripping of the bar ends and quick grip changes between the basic bar and the bar ends. The sealing cap extends from the upper edge of the bar clamp's outer face in a slope down to the bar end clamp sealing it off tangentially.

Inserted into the basic bar clamp is a sleeve which receives the basic bar and is slipped under the rubber grip. It also serves to strengthen the extreme end of the basic bar.

A favorable embodiment of the basic bar clamp is provided with a clamp slot on the rear (facing the driver) which extends across toward the longitudinal axis of the basic bar clamp, the appropriate clamping bolt hole being essentially perpendicular to it. This arrangement results in a symmetric clamp. A basic bar clap of this kind does not interfere with gripping, allowing the driver to grip beyond the basic bar clamp. By positioning the clamping bolt perpendicular to the clamp slot, an effective and reliable symmetric clamp is obtained for securing the basic bar.

The symmetric bar end clamp has a clamp slot located in the periphery that faces toward the longitudinal axis of the basic bar clamp. The appropriate clamping bolt hole is perpendicular to it. This skillful configuration does not interfere with gripping. In addition, the clamping bolt is located in an area which is covered by the sealing cap. It is favorable to provide the clamp slot of the bar end clamp with an inclination relative to the basic bar clamp and to have it intersect the longitudinal axis of the bar end clamp, as this serves to increase the clamping effect.

In order to strengthen the joining device, the section accommodating the bolt hole of the bar end clamp may be reinforced by radially extending ribs. In addition, the contour of the transition piece, facing away from the basic bar clamp may have the shape of reinforcement ribs.

For an improved ergonomic design, the surface extending from the area of the basic bar clamp, which faces away from the driver, to the area of the sealing cap, which faces away from the driver, may be S-shaped. A surface shaped like this ideally fits the grasping hand which—starting with the little finger—describes a spiral curve up to the ball of thumb. By providing the extreme basic bar ends with a surface to fit the contours of the hand, they can be gripped with increased hand comfort, as pressure points affecting the hands are eliminated.

The clamp slot of the bar end clamp may serve as an index for a scale fitted to the rear of the bar end. It ensures equal adjustment and alignment of the two bar ends. When replacing bar ends, an accurate angular alignment is also ensured.

The bar end clamped by the joining device may be shaped in such a way that a first straight section which represents the first hand position is followed by a bend at an angle of 3 to 6 degree, preferably 4 degrees. This bend is followed by another bend pointing to the same direction. Another straight section representing another hand position follows up. The 3 to 6 degree bend, preferably a 4 degree bend, allows quick and easy changes of hand positions. The bend can also be used for positioning the hand. It fits the hand contour snugly, thereby causing the hand to turn inward which improves the position or the hand, i.e. the angle at the wrist.

The sleeve used in the basic bar clamp may be provided with a flattened section on the outside. The edge which faces toward the joining device may meet flush with the face of the basic bar clamp facing toward the bar. A rubber grip may be installed on the enlarged surface. By doing so, the basic bar clamp face can be perfectly matched, and the grip space increased in this section of the bar.

BRIEF DESCRIPTION OF THE DRAWINGS

The disclosures of the present invention are further described and depicted by the following figures.

FIG. 7a Discloses a cross-sectional view of the basic bar clamp area of the joining device.

FIG. 7b Discloses line 7b—7b of FIG. 7a in cross section.

FIG. 8a Discloses a rear view of the bar end clamp seen in direction of arrow VIII of FIG. 3.

FIG. 8b Discloses a top view of FIG. 8a.

DETAILED DESCRIPTION OF THE INVENTION

Figure 1:
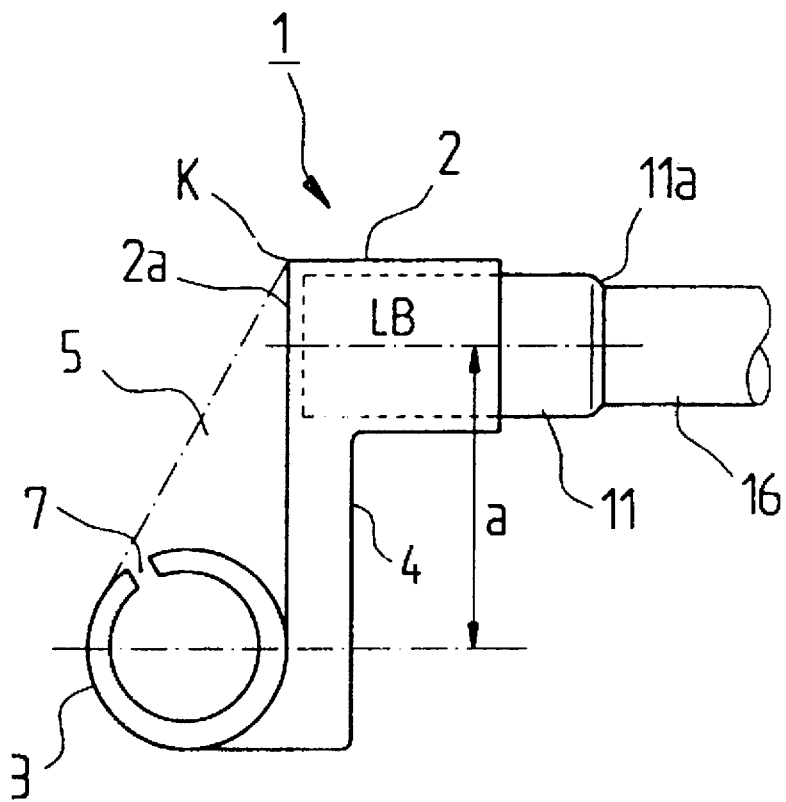
FIG. 1 Discloses a simplified front view of the basic principle underlying the joining device in accordance with the present invention.

FIG. 1 shows a simplified front view of the basic principle underlying the joining device in accordance with the present invention. The joining device 1 features a basic bar clamp 2 which serves to secure joining device 1 to the end of a basic bar 16. Inserted into the basic bar clamp 2 is a thin-walled sleeve 11 which serves to receive basic bar 16. The dashed line shows how far sleeve 11 extends into basic bar clamp 2. The sleeve's end facing away from the basic bar clamp has a tapered section 11a which enables the sleeve to be secured on the handlebar and easily slipped under the rubber grips (not shown) at the ends of the handlebar. The configuration shown for bar clamp 2 and sleeve 11 provides a rather smooth and clean transition from the clamp to the bar which is obtained by installing a rubber grip over sleeve 11 in such a way as to make it flush with the bar clamp outer surface. Due to the smooth transition, the rider is able to grip the extreme ends of the handlebar with the palm of the hands which are not affected by pressure points or irregularities on the surface.

Contiguous to the face of bar clamp 2 that points away from basic bar 16 (called outward face) is a transition piece 4, its longitudinal axis extending downward from and essentially perpendicular to the axis LB of basic bar clamp 2. The bar end clamp 3 adjoins the side of transition piece 4 that faces away from basic bar 16. The term "essentially perpendicular" is used to denote that, by means of transition piece 4, bar end clamp 3 is offset downward. It is also possible to position the transition piece relative to the basic bar clamp at an angle smaller or greater than 90 degrees. As is evident from FIG. 1, due to the configuration of basic bar clamp 3, the complete bar width is available for gripping, no gripping space is lost because of the bar clamp, and there is enough room for the little finger.

The hatched area 5 designates a sealing cap which adjoins the outward face 2a of basic bar clamp 2, the side of transition piece 4 that faces away from the basic bar, as well as the periphery of bar end clamp 3 that points to the axis LB. By offsetting basic bar clamp 2 and bar end clamp 3, optimum grip width is provided for hard pulling action, even when gripping the extreme rear of the bar end. The sealing cap 5 also allows ergonomically correct gripping from the side. Distance A between the centerlines of clamp 2 and 3 ranges from 2.5 to 10 cm, preferably from 4 to 5 cm. Bar end clamp 3 has a clamp slot 7. For the embodiment shown, the upper edge K of the basic bar clamp face which is essentially perpendicular to the axis LB lies on a tangent which meets the bar end clamp 3 and is essentially perpendicular to the basic bar clamp axis LB. The joining device in accordance with the present invention has the effect that the hand positions at the extreme end of the basic bar and at rite rear of the bar end overlap. Since the basic bar 16 can be inserted far into the bar clamp 2 as depicted by the dotted section in FIG. 1, the width of the basic bar 16 is only slightly increased, the increase amounting to 24 mm for instance. The basic bar clamp itself is narrow, having a width of no more than 12 to 16 mm, preferably 14 mm.

Figure 2:
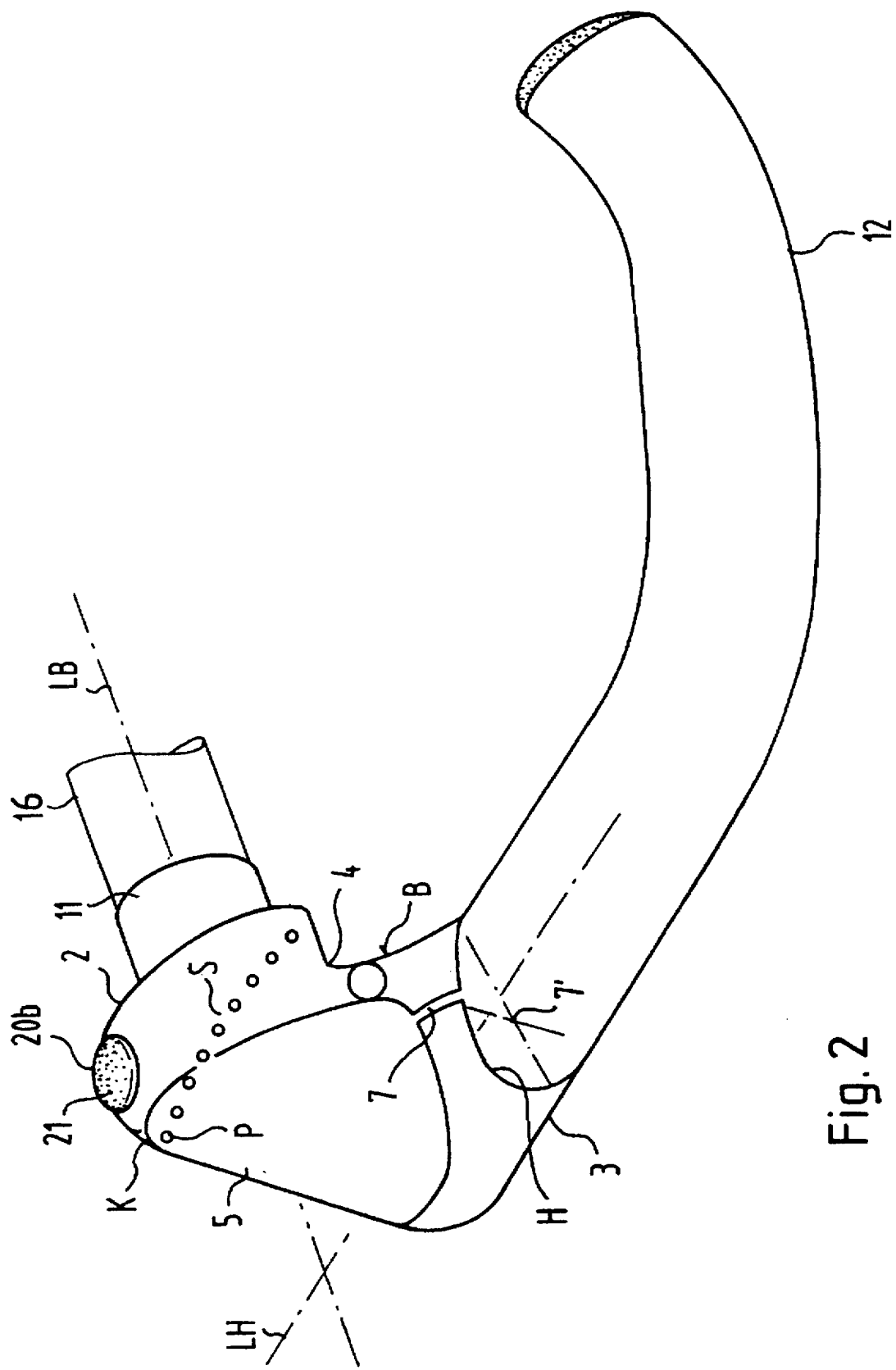
FIG. 2 Discloses a perspective drawing of an embodiment of the joining device in accordance with the present invention.

FIG. 2 is a perspective drawing of the joining device 1 in accordance with an embodiment of the present invention. Bar end 12 is secured by bar end clamp 3 having clamp slot 7. As previously described, a sleeve 11 extends beyond basic bar clamp 2 and is intended to receive basic bar 16. A plastic cap 5 covers the area extending between the outward face of basic bar clamp 2, the adjacent part of transition piece 4, and the periphery of the bar end clamp facing toward the basic bar clamp axis.

Figure 3:
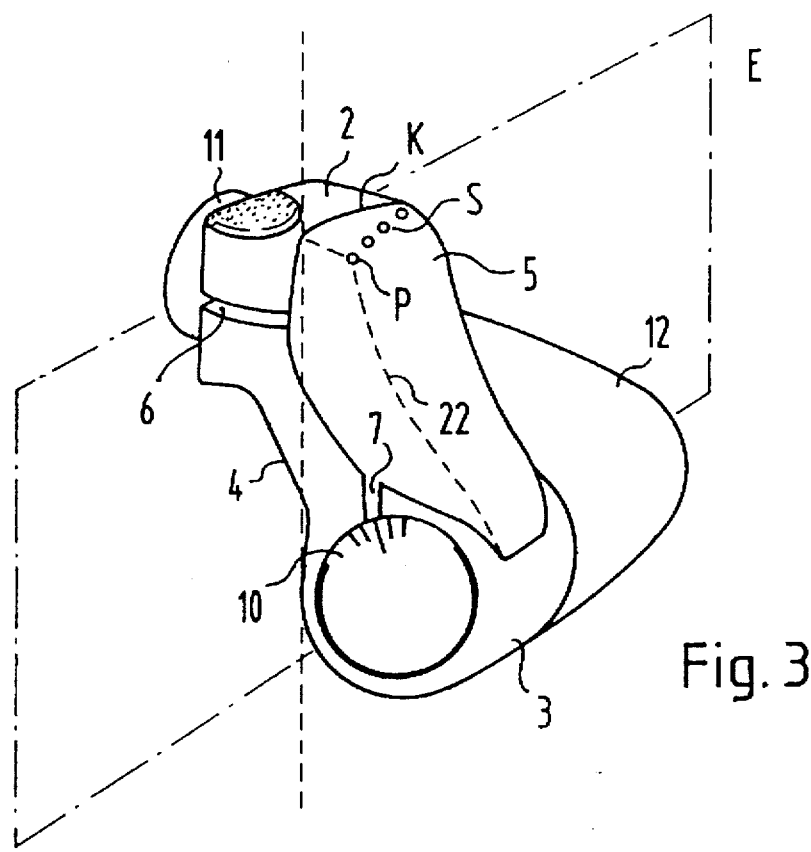
FIG. 3 Discloses a perspective rear view of the joining device in accordance with the present invention.

The surface of the joining device is shaped to fit the contour of the hand. The grasping hand forms a spiral curve extending from the little finger to the ball of the thumb. A simple test by watching a grasping hand will prove the point. In order to give the hand a snug fit on the contour of the joining device., the surface extending from the front of basic bar clamp 2 (facing away from the driver) to the portion of sealing cap 5 that faces away from basic bar clamp 16 is provided with an S-shaped curve, as depicted by the cloned line 5 in FIG. 2. The spiral curve extends to point P for the embodiment of the present invention of which a rear view is shown in FIG. 3. Point P is essentially on the same level as the upper edge K of the bar clap face so that, trader extreme conditions, the hand may grip beyond bar clamp 2 toward point P on sealing cap 5. The dashed line 22 marks the rear edge of cap 5 which together with the face of bar end 12 and the face of bar end clamp 13 forms an essentially straight plane which extends essentially parallel to the axis LB of the basic bar clamp. Beginning at point P and the dotted line S, cap 5 slopes down to bar end clamp 3 and meets the cylindrical configuration of bar end clamp 3 tangentially. For the embodiment shown the face upper edge K of basic bar clamp 2 lies in the plane E, which is essentially perpendicular to axis LB of basic bar clamp 2 as well as tangent to the bar end clamp side facing basic bar clamp 2.

For another embodiment, the face upper edge K may lie in a different plane which may intersect the bar end clamp or may run parallel to a tangent from the bar end clamp, if required due to the dimensions of the clamps or the distance between clamps 2 and 3.

As shown clearly in FIG. 2, the area B located on the front side of transition piece 4 (facing away from the driver) is positioned well above the bar end clamp edge H facing bar end 12 in order to provide the rear part of the palm with a surface to which the hand fits snugly when gripping the bar end in the rear. In addition, the rounded shape of the area which extends upward prevents hand soreness and keeps the wrist essentially free.

FIGS. 2 and 3 clearly show clamp slots 7 and 6 of clamps 2 and 3 respectively. On basic bar clamp 2, slot 6 is located facing the driver and extending across toward the longitudinal axis LB of basic bar clamp 2. The clamp bolt hole is essentially perpendicular to it.

FIG. 7a shows a cross sectional view of basic bar clamp 2. A banjo bolt is used for improved clamping effect. Without a protruding head, the bolt is inserted in hole 22 and sealed off with a plastic plug 21, as shown in FIGS. 2 and 3, which results in a smooth surface mid improved hand comfort. The clamping elements are pressed together symmetrically by means of a clamping bolt. FIG. 7b shows a cross section along the line 7b—7b of FIG. 7a. Bolt hole 22 and cavity 23 of basic bar clamp 2, into which sleeve 11 and basic bar 16 are inserted, are clearly visible.

Bar end clamp 3 has a clamp slot 7 which is located in the section of the bar end clamp that extends toward the longitudinal axis or basic bar clamp 2. The clamp bolt hole is essentially perpendicular to the slot. For the present embodiment, however, it is particularly favorable to incline clamp slot 7 toward basic bar clamp 2, as is visible in FIG. 3. It is of further advantage to have the slot intersect the longitudinal axis LH of bar end clamp 3.

Figure 9A:
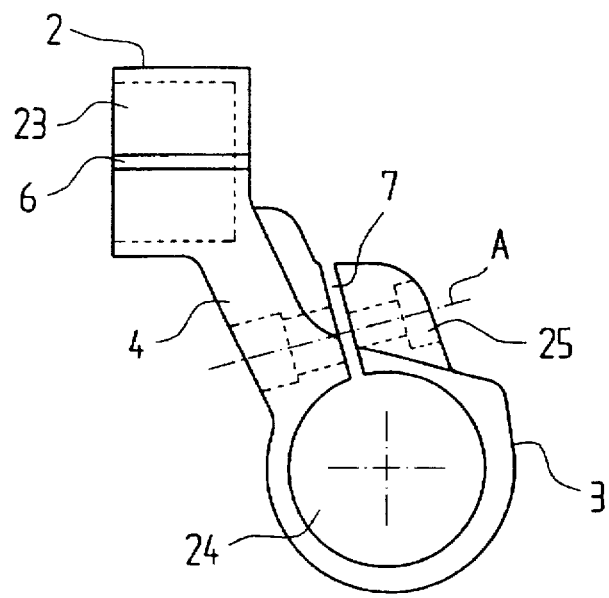
FIG. 9a Discloses the position of the bar end clamp slot in a rear view of the joining device in accordance with the present invention.
Figure 9B:
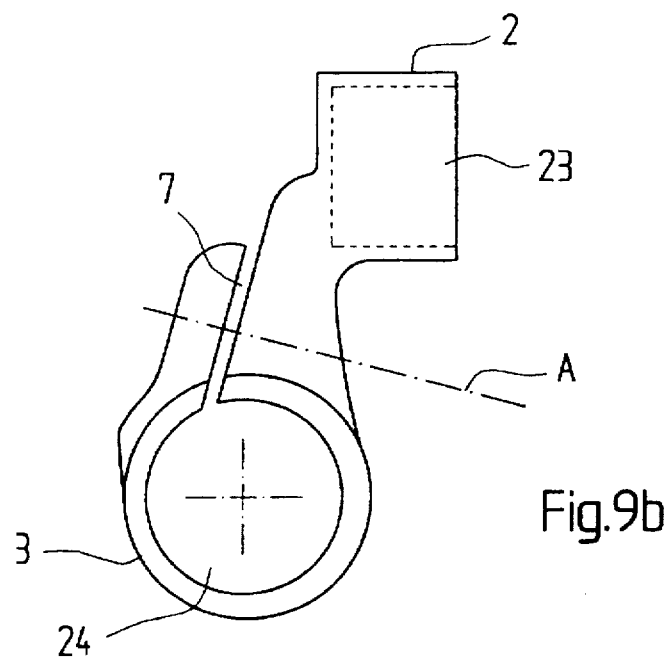
FIG. 9b Discloses the position of the bar end clamp slot in a front view.

FIGS. 9a and 9b clearly show the position of slot 7. FIG. 9a shows a rear view of basic bar clamp 2 with a cavity 23. In addition, cavity 24 of bar end clamp 3 is shown which receives the bar end tube. As previously described, the two clamps 2 and 3 are connected by memos of transition piece 4. Bar end clamp 3 has slot 7, and clamping bolt hole 25 is perpendicular to it. This symmetric clamp too, uses a banjo bolt for clamping because of the advantages previously described. The cross section of transition piece 4 surrounding bolt hole 25 is increased. FIGS. 9a and 9b clearly show the inclination of clamp slot 7 which intersects axis LH of bar end clamp 3. Slot 7 is more to the left of the clamp axis in the front view drawing of FIG. 9b, and more to the other side of the axis in the rear view drawing of FIG. 9a. By inclining the slot in direction of basic bar clamp 2 and by having it intersect the axis LH of bar end clamp 3, both the clamping strength and the rigidity are improved. When comparing FIGS. 2 and 3, the inclination of slot 7 is clearly visible. In FIGS. 3, clamp slot 7 is to the left of axis LH toward the basic bar. Whereas in FIG. 2, slot 7' projected relative to the bar end axis LH shows clamp slot 7 to be inclined away from the basic bar clamp in this area of the bar end axis.

Figure 4:
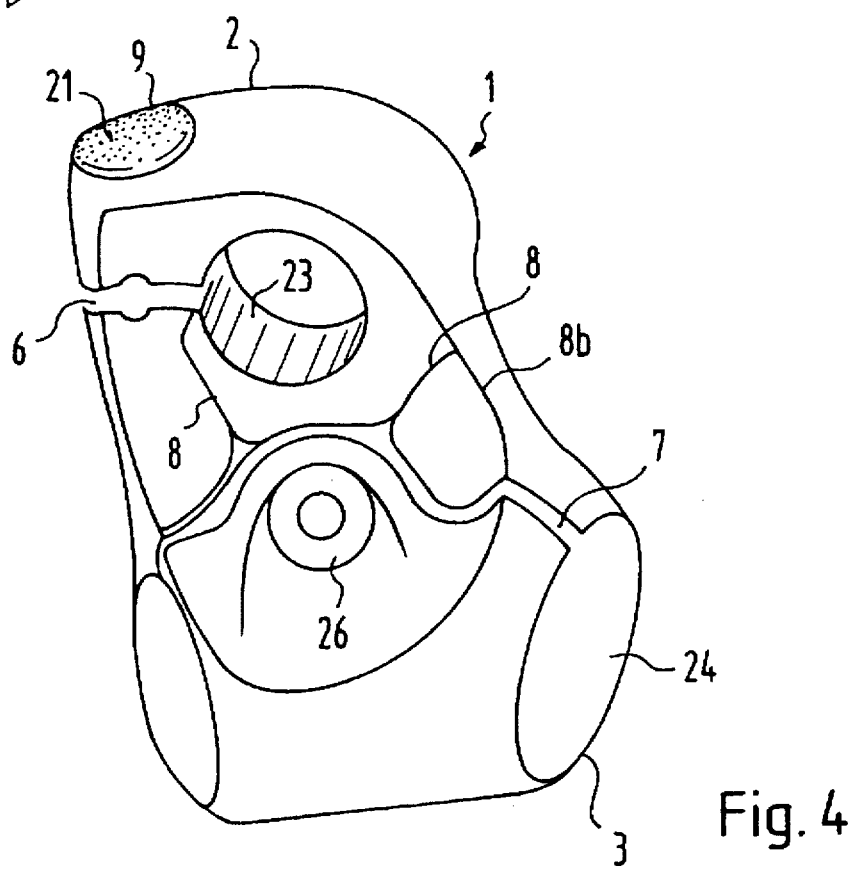
FIG. 4 Discloses a perspective drawing of a side view of the joining device without sealing cap in accordance with the present invention.

For a special embodiment shown in FIGS. 8a and 8b, the axis of the bar end clamp is not perpendicular to the basic bar clamp, but is inclined relative to clamp 2 at an angle of 17 degrees for example. FIG. 8a shows a rear view of the bar end clamp and FIG. 8b a top view of FIG. 8a. FIG. 4 shows a perspective side view of the joining device 1 in accordance with the present invention without sealing cap 5. As previously described, basic bar clamp 2 has a cavity 23 to receive sleeve 11 and bar end clamp 3 has a cavity 24 to receive bar end 12. Banjo bolt 26 serves to clamp the bar end clamp together across slot 7 in order to hold bar end 12 firmly. Bolt 26 is inserted into a section of transition piece 4 that is provided with radial reinforcement ribs 8 to increase the rigidity of joining device 1 which is not a solid configuration. The contour 8B of the portion of the device that extends away from basic bar 16 may be shaped like reinforcement ribs. Due to the fact that the whole area between basic bar clamp 2, transition piece 4, and bar end clamp 3 facing the basic bar axis, is not made of solid material, but is designed to save material and weight by the use of reinforcing ribs, a joining device is obtained which is both light and rigid.

For installation on the joining device 1, sealing cap 5 is provided with a loop which is located in the plane of slot 6. By engaging the loop in slot 6, the sealing cap can easily be secured by means of the clamping bolt. It is also possible to provide the inside of sealing cap 5 and the outward rim of the joining device 1 with additional pin-type elements which engage and hold sealing cap 5 in position.

The configuration in accordance with the present invention allows the joining device to be machined as a one-piece component from the solid by cutting, drilling, and sawing. The component can also be produced by die forging, using the 6000 and 7000 series aluminum alloys to save as much weight as possible. Die casting is another suitable process for producing the joining device of the present configuration. Suitable materials are thermoplastic and thermosetting polymers for further weight reduction. For the plastic version, the basic bar clamp and the sleeve are fixed in position by splines.

FIG. 3 clearly shows that, on the rear (facing the driver), basic bar clamp 2 adjoins the essentially straight inward face of joining device 1 in a way as to form an edge which extends upward along the circumference of basic bar clamp 2. This edge serves to confine the rubber grip which, being installed on sleeve 11, is flush with the edge, making the basic bar surface perfectly smooth for high gripping comfort (unrestricted gripping action).

Figure 5:
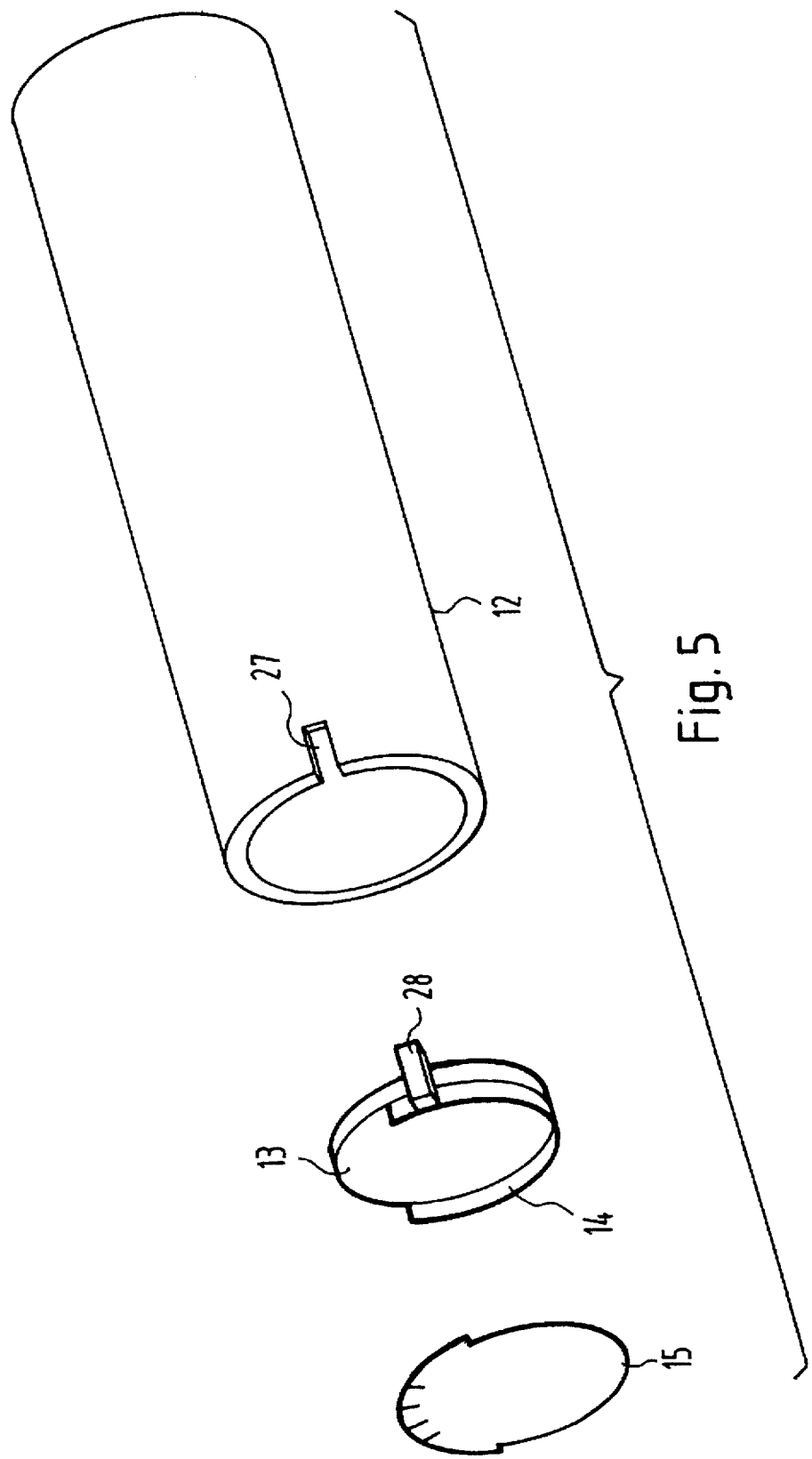
FIG. 5 Discloses an exploded view of the rear of a bar end.

As shown in FIG. 3, a scale 10 is provided on the, rear of bar end 12 to enable accurate alignment of bar end 12 relative to joining device 1. For this purpose, bar end clamp slot 7 serves as an index. Details of this configuration are shown in FIG. 5. Bar end 12 is provided with a notch 27. Cap 13 is fitted with a pin which engages notch 27 in order to secure and align cap 13 on bar end 12. There is a rim provided around cap 13 onto which a recessed dial 15 is installed. Its recess matches the rim of cap 13, thereby ensuring accurate alignment of the graduations. After insertion into joining device 1, bar end 12 is made flush with the rear of the joining device mid slot 7 by means of the dial so that misalignment due to parallax is avoided.

Figure 6:
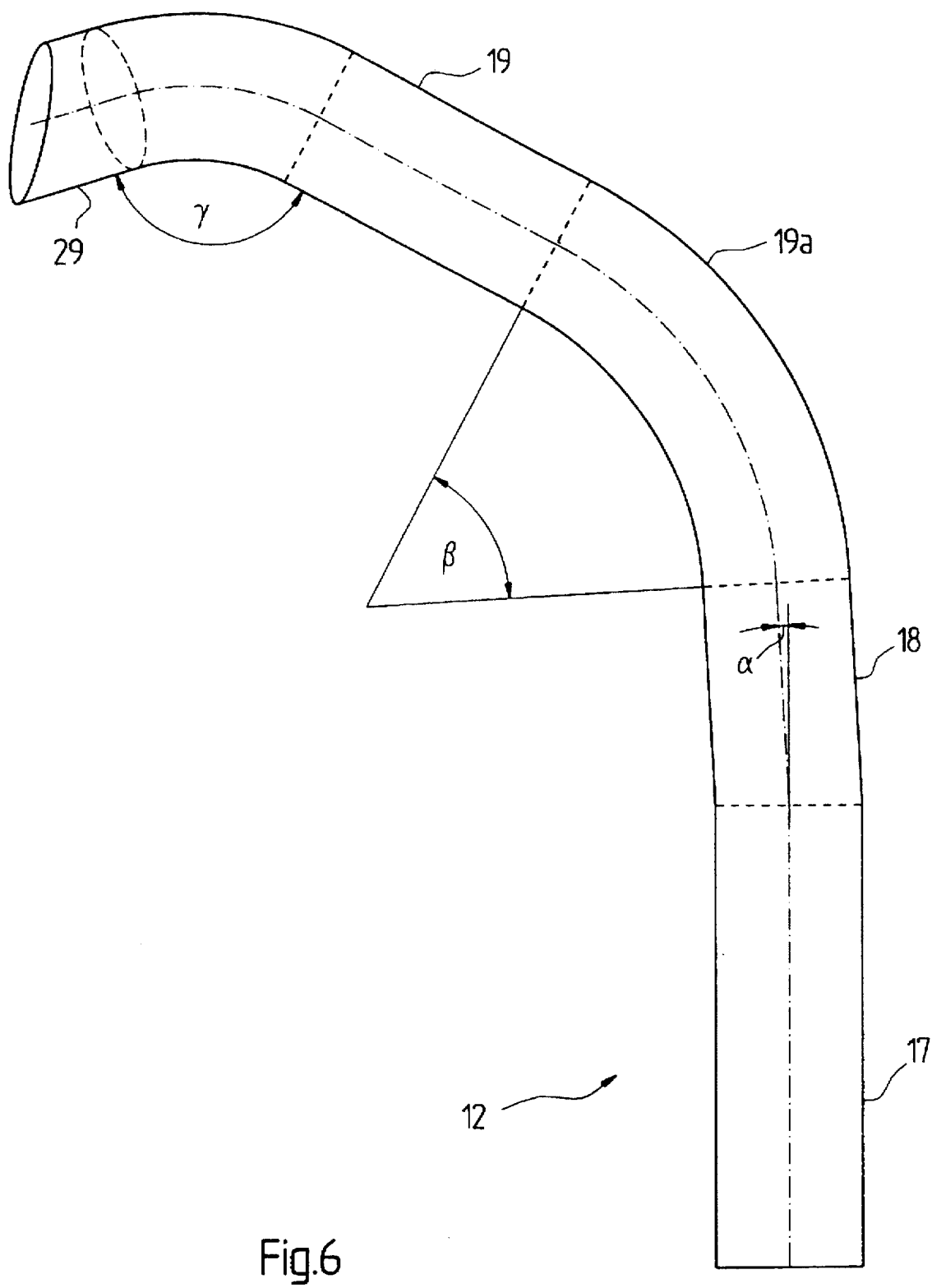
FIG. 6 Discloses a top view of a preferred embodiment of a bar end in accordance with the present invention.

FIG. 6 shows a top view of a favorable embodiment of a bar end 12 in accordance with the present invention. This bar end is characterized by a 3 to 6 degree bend 18, preferably a 4 degree bend (α), which follows a straight section 17 providing a principal hand position. The length of the straight section 17 is 6 to 9 cm, preferably 7.6 cm, that of the 4 degree bend 18 is 2 to 4 cm, preferably 3 cm. Following bend 18 is a second bend 19a which is bent in the same direction as section 18. The angle is between 50 and 60 degrees, preferably 57 degrees (β), relative to section 18. Following bend 19a is a straight section 19. Its length is 3 to 5 cm, preferably 4.5 cm. Section 19 is followed by a bend of 110 to 140 degrees, preferably 132 degrees (γ), which is ended by a final section 29 having a length of 1 to 4 cm, preferably 2 cm. The outstanding feature of this bar end is the approx. 4 degree bend 18 which is located between the principal hand positions on sections 17 and 19, thereby giving the bar end an improved fit to the contour of the hand.

Figure 10:
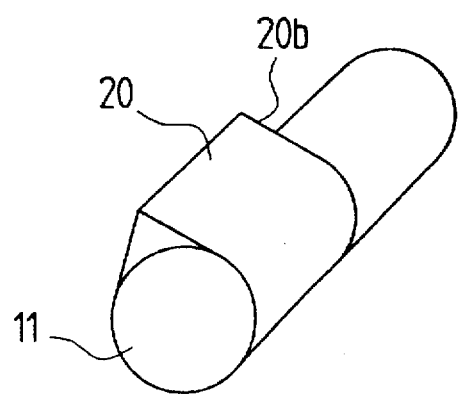
FIG. 10 Discloses a clamping sleeve in accordance with an embodiment of the present invention.

FIG. 10 shows another embodiment of sleeve 11 in accordance with the present invention. The sleeve is characterized by a flattened section 20 extending radially on part of the circumference. With the sleeve installed in the basic bar clamp, the edge 20b matches the upper edge of the bar clamp's face pointing toward the basic bar, thereby increasing the gripping area at the bar clamp for improved gripping action.

The previously described characteristics of the different embodiments of the joining device in accordance with the present invention may be used in any given combination.

I claim:

1. A joining device for joining a steering bar end piece to a basic steering bar comprising:

a basic steering bar clamp and a steering bar end piece clamp;

the steering bar end piece clamp being offset from the basic steering bar clamp such that the longitudinal axis of the steering bar end piece clamp does not intersect a contour of the basic steering bar clamp, the basic steering bar clamp and the steering bar end piece clamp being connected by means of a transition piece;

the transition piece (4) being contiguous to a side (2a) of the basic steering bar clamp (2) which faces away from a basic steering bar (16) insertable into the basic steering bar clamp (2);

the transition piece (4) extends such that it offsets the steering bar end piece clamp (3) from a longitudinal axis (LB) of the basic steering bar clamp (2); and the steering bar end piece clamp (3) is located on a side of the transition piece (4) facing away from the basic steering bar (16) insertable into the basic steering bar clamp (2).

2. A joining device of claim 1, wherein a sealing cap (5) adjoins the side (2a) of the basic steering bar clamp (2) that faces away from the basic steering bar (16), adjoins the side of the transition piece (4) that faces away from the basic steering bar (16), and adjoins a portion of the steering bar end piece clamp (3) that faces toward the longitudinal axis (LB) of the basic steering bar clamp (2).

3. A joining device of claim 2, wherein an upper edge (K) of the side (2a) of the basic steering bar clamp (2) facing away from the basic steering bar (16), extends essentially perpendicular to the longitudinal axis (LB) of the basic steering bar clamp (2), lies in a plane tangent to the side of the steering bar end piece clamp (3) facing the basic steering bar clamp (2), and is essentially perpendicular to the longitudinal axis (LB) of the basic steering bar clamp (2).

4. A joining device of claim 3, wherein the sealing cap (5) extends from the upper edge (K) of the side (2a) of the basic steering bar clamp (2) in a slope down to the basic steering bar end piece clamp (3) and tangentially terminates therewith.

5. A joining device of claim 4 further comprising a surface extending from a circumferential area of the basic steering bar clamp (2) facing away from the steering bar end piece clamp (3), to an area of the sealing cap (5) facing away from the basic steering bar (16) has a spiral shape.

6. A joining device of claim 1, wherein a sleeve (11) for receiving the basic steering bar (16) extends into the basic steering bar clamp (2).

7. A joining device of claim 6 wherein an outside portion of the sleeve (11) is provided with an area (20) extending radially outwardly, an edge (20b) of said area (20) matches a face of the basic steering bar clamp (2) directed toward the basic steering bar (16).

8. A joining device of claim 1, wherein the basic steering bar clamp (2) has a first clamp slot (6) on a side opposite to an insertion side of the steering bar end piece (12) into the steering bar end piece clamp (3), said first clamp slot (6) extends essentially transversely with respect to the longitudinal axis (LB) of the basic steering bar clamp (2), a first hole (22) for a clamping bolt being essentially perpendicular to said first clamp slot (6).

9. A joining device of claim 8, wherein the steering bar end piece clamp (3) has a second clamp slot (7) located on a peripheral area of the steering bar end piece clamp (3), said second clamp slot extends toward the longitudinal axis (LB) of the basic steering bar end piece clamp (2), a second hole (25) for a clamping bolt being essentially perpendicular to said second clamp slot (7).

10. A joining device of claim 9 further comprising radially outwardly extending reinforcing ribs (8) in an area where the second hole (25) of the steering bar end piece clamp (3) is located, and reinforcing ribs in outer contours of an area of the transition piece (4) facing away from the basic steering bar clamp (2).

11. A joining device of claim 9 further comprising a scale (15) affixed to a rear of a steering bar end piece (12), said scale (15) being indexable by the second clamp slot (7) of the steering bar end piece clamp (3).

12. A joining device of claim 11 wherein the steering bar end piece (12) has a shape comprising a first straight section (17) which represents a first hand position, following by a bend piece (18) bent at 3 to 6 degrees, followed by another bend piece (19a) bent in the same direction, followed by a second straight section (19) which represents another hand position.

13. A joining device of claim 9 further comprising reinforcing ribs in an outer contour of an area of the transition piece (4) facing away from the basic steering bar clamp (2).

14. A joining device of claim 1, wherein the second clamp slot (7) of the steering bar end piece clamp (3) inclines in a direction of the basic steering bar clamp (2) and intersects the longitudinal axis (LH) of the steering bar end piece clamp (3).

* * * * *